US011939199B2

(12) United States Patent
Crocker

(10) Patent No.: US 11,939,199 B2
(45) Date of Patent: Mar. 26, 2024

(54) EXTENSION ARM ACCESSORY UNIT FOR A DRYWALL CRANE FORK ASSEMBLY

(71) Applicant: Kevin Crocker, Belton, SC (US)

(72) Inventor: Kevin Crocker, Belton, SC (US)

( * ) Notice: Subject to any disclaimer, the term of this patent is extended or adjusted under 35 U.S.C. 154(b) by 449 days.

(21) Appl. No.: 17/480,848

(22) Filed: Sep. 21, 2021

(65) Prior Publication Data

US 2023/0091981 A1 Mar. 23, 2023

(51) Int. Cl.
*B66F 9/18* (2006.01)
*E04G 21/16* (2006.01)
*B66F 9/065* (2006.01)

(52) U.S. Cl.
CPC ................ *B66F 9/18* (2013.01); *E04G 21/16* (2013.01); *B66F 9/065* (2013.01)

(58) Field of Classification Search
CPC .. B66F 9/14; B66F 9/142; B66F 9/144; B66F 9/19; B66C 1/105; B66C 1/26; B66C 1/68
USPC .............................................. 414/10, 11, 607
See application file for complete search history.

(56) References Cited

U.S. PATENT DOCUMENTS 4,708,576 A * 11/1987 Conley ..................... B66F 9/12 414/785
5,097,609 A * 3/1992 Swaggert ................ E02F 9/003 37/903
5,118,247 A * 6/1992 Royden ..................... B66F 9/16 414/667
5,207,297 A * 5/1993 Beattie ...................... B66F 7/04 187/394
5,339,926 A 8/1994 McCanse et al.
9,828,224 B1 * 11/2017 Hamilton .................. B66F 9/12
10,556,783 B2 * 2/2020 Ivey ........................... B66F 9/19
2013/0259618 A1 10/2013 McGrane et al.

FOREIGN PATENT DOCUMENTS

CN 203794568 U 8/2014
CN 104249984 A 12/2014
CN 112093726 A 12/2020
CN 212740641 U 3/2021
CN 212832622 U 3/2021

* cited by examiner

*Primary Examiner* — Mark C Hageman
(74) *Attorney, Agent, or Firm* — Kim and Lahey Law Firm, LLC; Seann P Lahey

(57) ABSTRACT

A mounting bracket a generally C-shaped arrangement for receiving a fork carrier beam of a drywall crane fork assembly. A removable sidewall carried by the mounting bracket for enclosing the mounting bracket around the fork carrier beam. A tensioning member carried by the removable sidewall for biasing against the fork carrier beam. An extension arm carried in an extension arm port, wherein the extension arm has a generally L-shaped arrangement with a first arm portion adjustably carried in the extension arm port, and a second arm portion disposed at a distal end of the first arm portion and extending perpendicular to the first arm portion. Accordingly, the mounting bracket is removably mountable around the fork carrier beam and provides the extension arm extending in an adjustable arrangement perpendicular to lifting forks of the drywall crane fork assembly to assist with sliding drywall off the fork assembly over an extended distance.

20 Claims, 9 Drawing Sheets

EXTENSION ARM ACCESSORY UNIT FOR A DRYWALL CRANE FORK ASSEMBLY

BACKGROUND OF THE INVENTION

1) Field of the Invention

The present invention relates material delivery cranes, and more particularly, to an extension arm accessory unit for mounting to the fork carrier beam of a drywall crane fork assembly.

2) Description of Related Art

Commercial vehicles that supply building materials such as drywall and wood panels to a job site often deliver the material using a crane truck. The crane truck includes a swinging crane arm with fork assembly for moving the materials. The materials are placed on the fork assembly and then the crane arm maneuvers the materials from the truck and delivers the materials as close to the actual job site as possible.

In some situations where a building includes an overhang, it can be difficult to maneuver the fork assembly and crane arm sufficiently under the overhang to allow for workers to remove the heavy drywall sheets from the forks for loading onto a materials handling cart, as would often be the case. Typically, the area underneath the overhang is not finished before materials such as drywall are required to be taken into the structure. In practice, the drywall is removed from the crane by sliding the sheets off the fork assembly and directly onto a material handling cart to be able to move multiple large heavy sheets of the drywall material within the structure to a given installation site. Thus, the material handling cart that is used to move the sheets of drywall after they are removed from the fork assembly of the crane arm cannot easily be maneuvered over lips and gaps in the flooring that exist between the end of the overhang and the interior of the structure due the heavy weight of the material. As a result, when an overhang area is to large, the drywall sheets cannot be slid directly off of the fork assembly and onto the material handling cart that is placed inside the structure. In this case, they must be carried individually by hand and then placed on the cart. This requires substantial extra time and effort and can lead to unwanted damage to the drywall materials being moved.

Accordingly, it is an object of the present invention to provide an extension arm accessory unit for mounting to the fork carrier beam of a drywall crane fork assembly that will extend the reach of the fork assembly underneath an overhang to allow materials such as drywall to slide from the fork assembly, across the extension arm, and directly onto a material handling cart inside the structure.

It is a further object of the present invention to an extension arm accessory unit that quickly and easily mounts to various design of crane arm fork assemblies.

SUMMARY OF THE INVENTION

The above objectives are accomplished according to the present invention by providing an extension arm accessory unit for a drywall crane fork assembly, the extension arm accessory unit comprising a mounting bracket having a top wall and bottom wall interconnected by a first sidewall to define a generally C-shaped arrangement, wherein the top wall and bottom wall extend parallel to each other and the first sidewall is perpendicular to the top and bottom walls; a removable second sidewall releasably attached to the mounting bracket, wherein the second sidewall extends between the top wall and the bottom wall in a perpendicular arrangement opposite the first sidewall; a tensioning member carried by the second sidewall for biasing against a fork carrier beam when mounted to draw the first sidewall against the fork carrier beam to secure the mounting bracket to the beam; an extension arm port carried on an exterior side of the first sidewall, wherein the extension arm port includes a port top wall, a port bottom wall and a port sidewall interconnecting the port top and port bottom walls to define a hollow interior extending along an axis parallel to a length of the first sidewall; an extension arm carried in the extension arm port, wherein the extension arm has a generally L-shaped arrangement with a first arm portion adjustably carried in the extension arm port, and a second arm portion disposed at a distal end of the first arm portion and extending perpendicular to the first arm portion; whereby the mounting bracket is removably mountable around a fork carrier beam and provides the extension arm extending in an adjustable arrangement perpendicular to lifting forks of the drywall crane fork assembly to assist with sliding drywall off the fork assembly over an extended distance.

In a further advantageous embodiment, a spacer block is disposed in the hollow interior of the extension arm port and carried by the exterior side of the first sidewall engaging the extension arm so that the extension arm is offset from the exterior side of the first sidewall.

In a further advantageous embodiment, the second sidewall includes an upper flange and a lower flange each extending parallel and adjacent to the top wall and the bottom wall respectively.

In a further advantageous embodiment, the upper and lower flanges extend inward from a distal end of each the top and bottom walls so that the second side wall is recesses from the distal ends of the top and bottom walls.

In a further advantageous embodiment, at least one opening is disposed in a distal end portion of the top wall; at least one opening is disposed in a distal end portion of the bottom wall; at least one opening is in the upper flange; and, at least one opening is in the lower flange, wherein the openings in the top wall, bottom wall, upper flange and lower flange are vertically aligned.

In a further advantageous embodiment, a removable securing member extends through the openings in the top wall, bottom wall, upper flange and lower flange fastening the second sidewall to the top wall and bottom wall of the mounting bracket in a releasable arrangement.

In a further advantageous embodiment, the securing member comprises a T-shaped bar having an elongated first portion extending through the openings in the top wall, bottom wall, upper flange and lower flange, and a handle portion extending perpendicular at a distal end of the first portion, wherein the handle portion engages the top wall to resist downward movement of the elongated first portion when dispose in the openings.

In a further advantageous embodiment, a securing member port is disposed at a distal end portion of the elongated first portion opposite the handle portion; and, a removable clip member extending through the securing member port when the securing member is dispose in the opening so that the removable clip member engages the bottom wall to resist upward movement of the elongated first portion to secure the second sidewall between the top and bottom walls of the mounting bracket.

In a further advantageous embodiment, a series of extension arm openings are defined in the first arm portion of the extension arm; at least one opening in the port top wall and the port bottom wall, wherein the opening in the port top wall and port bottom wall are vertically aligned with selected extension arm openings; and, a securing member removably extending through the openings in the port top wall, port bottom wall and selected extension arm openings to secure the extension arm in the extension arm port at a desired position.

In a further advantageous embodiment, a first protection pad is disposed on a top side of the second arm portion of the extension arm, wherein the first protection pad is releasably mounted to the top side of the second arm portion.

In a further advantageous embodiment, a second protection pad is disposed on a bottom side of the second arm portion of the extension arm, wherein the second protection pad is releasably mounted to the bottom side of the second arm portion.

In a further advantageous embodiment, the first and second protection pads are made of plastic. Preferably, the plastic is polytetrafluoroethylene (PTFE).

In a further advantageous embodiment, the tensioning member comprises a screw carried in a threaded opening of the second sidewall, wherein rotation of the screw directs the screw to engage against a surface of the fork carrier beam and draw the first sidewall against the fork carrier beam.

The above objectives are further accomplished according to the present invention by providing an extension arm accessory unit for a drywall crane fork assembly comprising a drywall crane fork assembly including a fork carrier beam carrying a pair of lifting forks; a mounting bracket carried on the fork carrier beam; the mounting bracket having a top wall and bottom wall interconnected by a first sidewall to define a generally C-shaped arrangement, wherein the top wall and bottom wall extend parallel to each other and the first sidewall is perpendicular to the top and bottom walls, and wherein the fork carrier beam is disposed between the top and bottom walls; a removable second sidewall releasably attached to the mounting bracket, wherein the second sidewall extends between the top wall and the bottom wall in a perpendicular arrangement opposite the first sidewall so that the fork carrier beam is disposed between the first and second sidewalls; a tensioning member carried by the second sidewall biasing against the fork carrier beam and drawing the first sidewall against the fork carrier beam to secure the mounting bracket to the beam; an extension arm port carried on an exterior side of the first sidewall, wherein the extension arm port includes a port top wall, a port bottom wall and a port sidewall interconnecting the port top and port bottom walls to define a hollow interior extending along an axis parallel to a length of the first sidewall; an extension arm carried in the extension arm port, wherein the extension arm has a generally L-shaped arrangement with a first arm portion adjustably carried in the extension arm port, and a second arm portion disposed at a distal end of the first arm portion and extending perpendicular to the first arm portion; whereby the mounting bracket is removably mountable around the fork carrier beam and provides the extension arm extending in an adjustable arrangement perpendicular to the lifting forks of the drywall crane fork assembly to assist with sliding drywall off the fork assembly over an extended distance.

In a further advantageous embodiment, a spacer block is disposed in the hollow interior of the extension arm port and carried by the exterior side of the first sidewall engaging the extension arm so that the extension arm is offset from the exterior side of the first sidewall.

In a further advantageous embodiment, a first protection pad is disposed on a top side of the second arm portion of the extension arm, wherein the first protection pad is releasably mounted to the top side of the second arm portion; and, a second protection pad is disposed on a bottom side of the second arm portion of the extension arm, wherein the second protection pad is releasably mounted to the bottom side of the second arm portion.

The above objectives are further accomplished according to the present invention by providing an extension arm accessory unit for a drywall crane fork assembly, the extension arm accessory unit comprising a mounting bracket a generally C-shaped arrangement for receiving a fork carrier beam of a drywall crane fork assembly; a removable sidewall carried by the mounting bracket for enclosing the mounting bracket around the fork carrier beam when mounted; a tensioning member carried by the removable sidewall for biasing against the fork carrier beam when mounted to draw the mounting bracket against the fork carrier beam to secure the mounting bracket to the beam; an extension arm port carried by the mounting bracket; an extension arm carried in the extension arm port, wherein the extension arm has a generally L-shaped arrangement with a first arm portion adjustably carried in the extension arm port, and a second arm portion disposed at a distal end of the first arm portion and extending perpendicular to the first arm portion; at least one spacer block disposed in the extension arm port engaging the extension arm so that the extension arm is laterally spaced from the mounting bracket to accommodate and extend past lifting forks carried on the fork carrier beam; a first protection pad disposed on a top side of the second arm portion of the extension arm, wherein the first protection pad is releasably mounted to the top side of the second arm portion; and, a second protection pad disposed on a bottom side of the second arm portion of the extension arm, wherein the second protection pad is releasably mounted to the bottom side of the second arm portion; whereby the mounting bracket is removably mountable around the fork carrier beam and provides the extension arm extending in an adjustable arrangement perpendicular to lifting forks of the drywall crane fork assembly to assist with sliding drywall off the fork assembly over an extended distance.

In a further advantageous embodiment, the first and second protection pads consist of polytetrafluoroethylene (PTFE).

In a further advantageous embodiment, the tensioning member comprises a screw carried in a threaded opening of the removable sidewall, wherein rotation of the screw directs the screw to engage against a surface of the fork carrier beam and draw the first sidewall against the fork carrier beam.

BRIEF DESCRIPTION OF THE DRAWINGS

The system designed to carry out the invention will hereinafter be described, together with other features thereof. The invention will be more readily understood from a reading of the following specification and by reference to the accompanying drawings forming a part thereof, wherein an example of the invention is shown and wherein.

Figure 1:
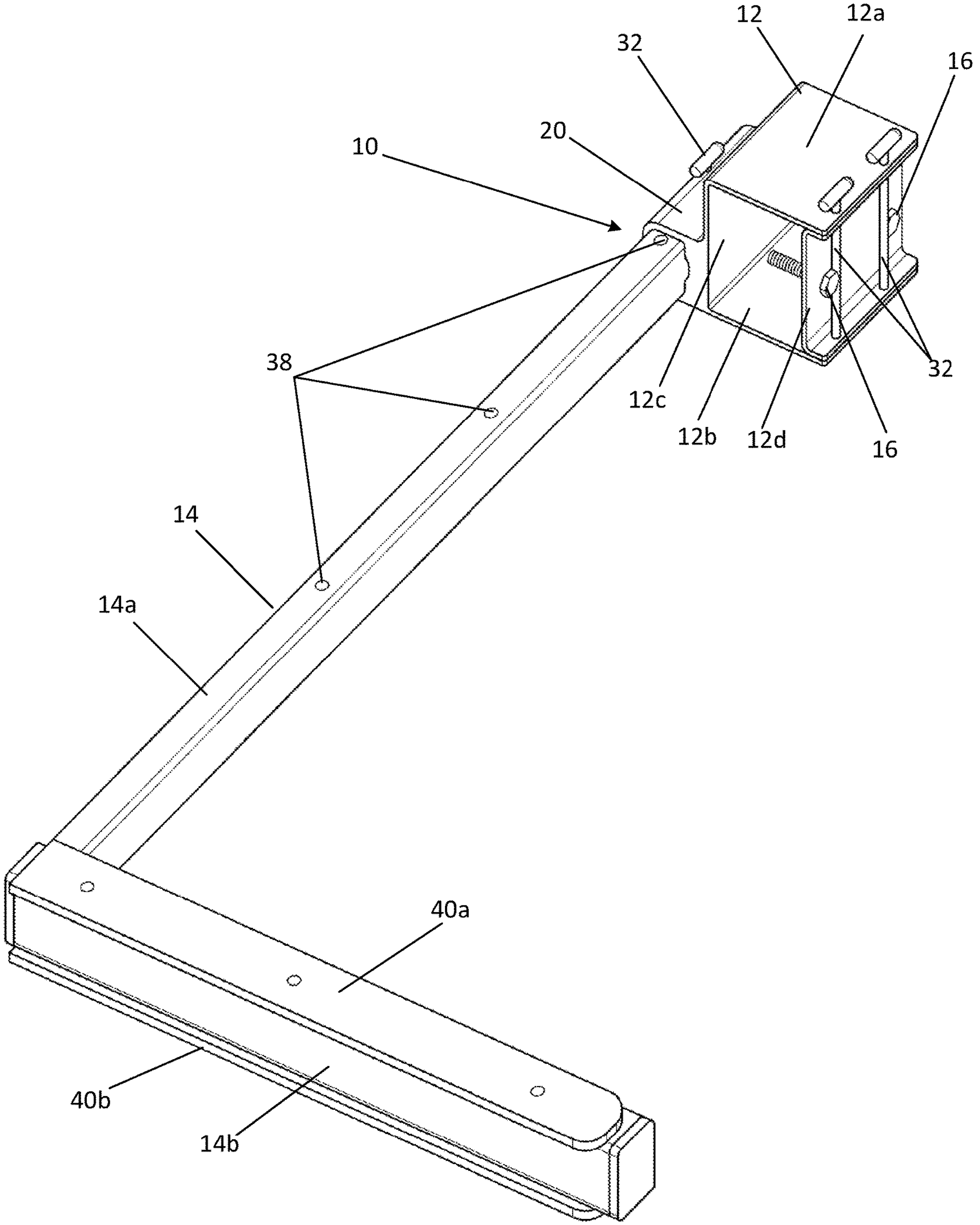
FIG. 1 shows a perspective view of an extension arm accessory unit for a drywall crane fork assembly according to the present invention.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Figure 2:
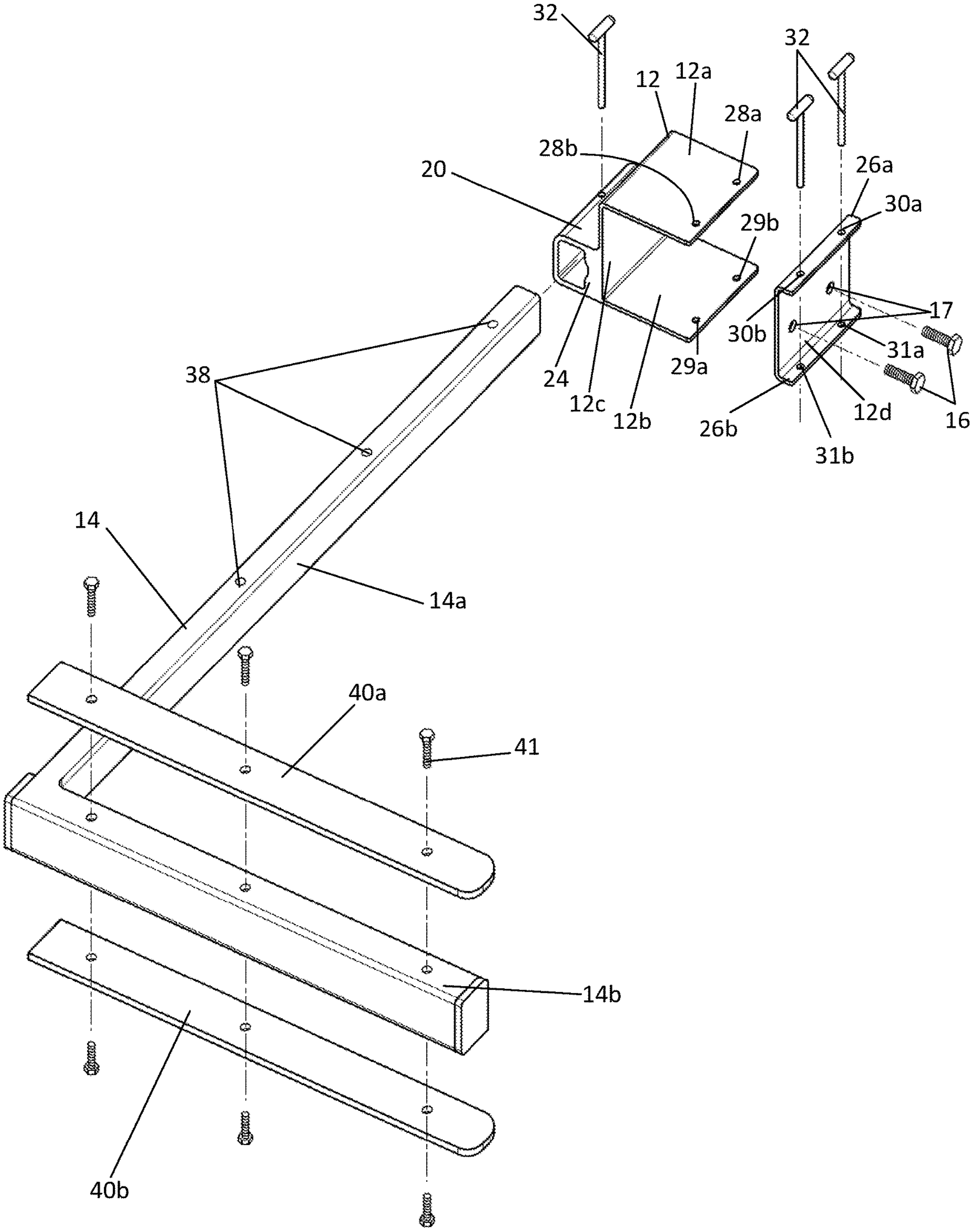
FIG. 2 shows an exploded view of the extension arm accessory unit according to the present invention.

Referring to FIGS. 1 and 2, an embodiment of the extension arm accessory unit, designated generally as 10, is shown for removably mounting to a drywall crane fork assembly to assist with sliding material off the fork assembly and directly onto a material handling cart. In the illustrated embodiment, the extension arm accessory unit 10 includes a mounting bracket 12 with an extension arm 14 slidably carried on mounting bracket 12.

Figure 3:
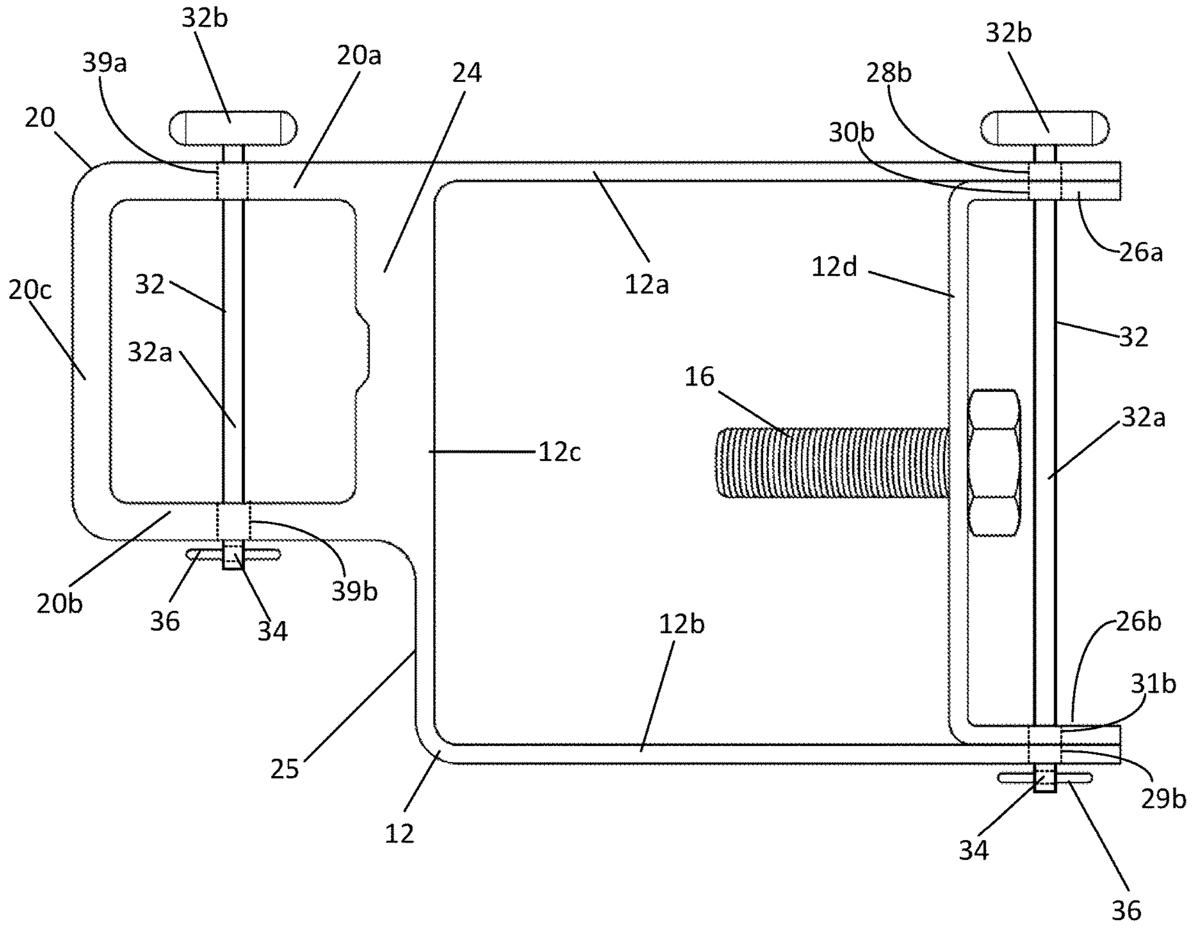
FIG. 3 shows and end view of the mounting bracket according to the present invention.
Figure 4:
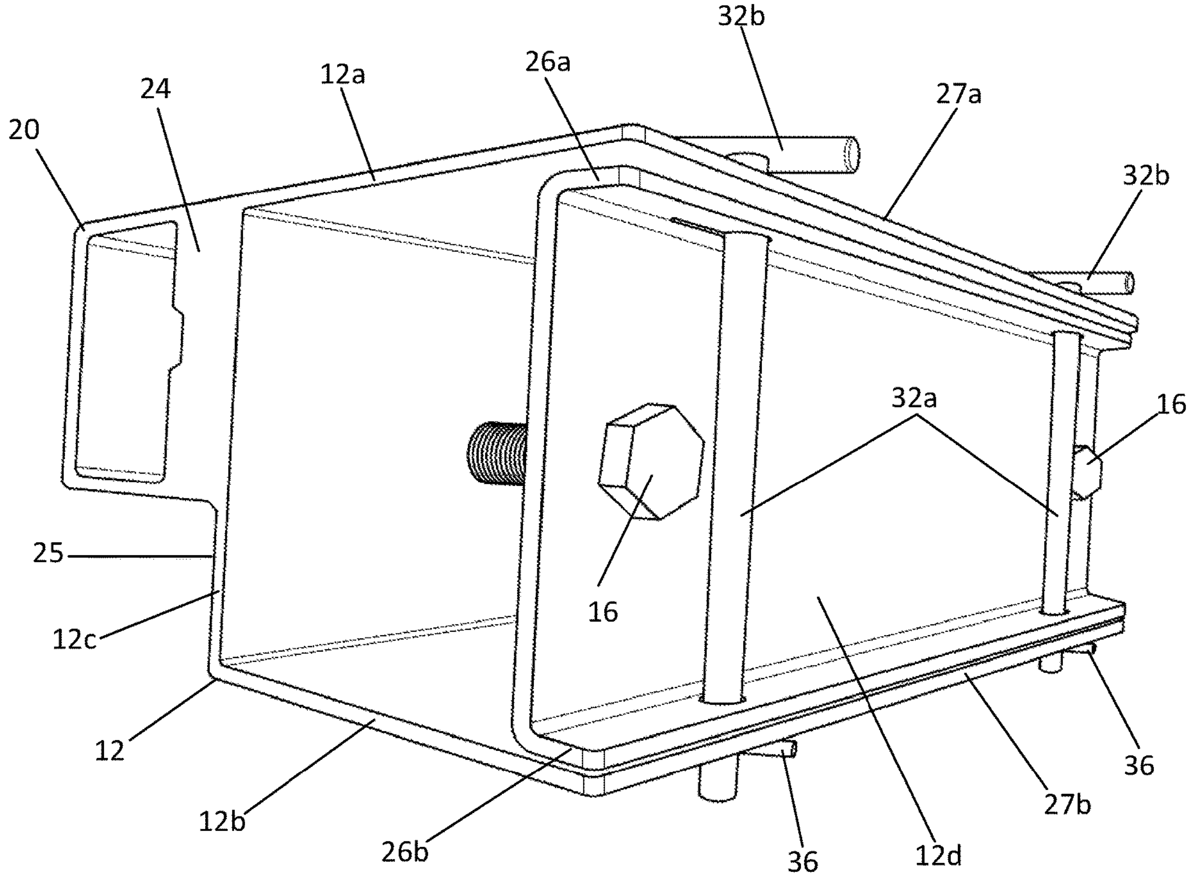
FIG. 4 shows a front perspective view of the mounting bracket according to the present invention.
Figure 5:
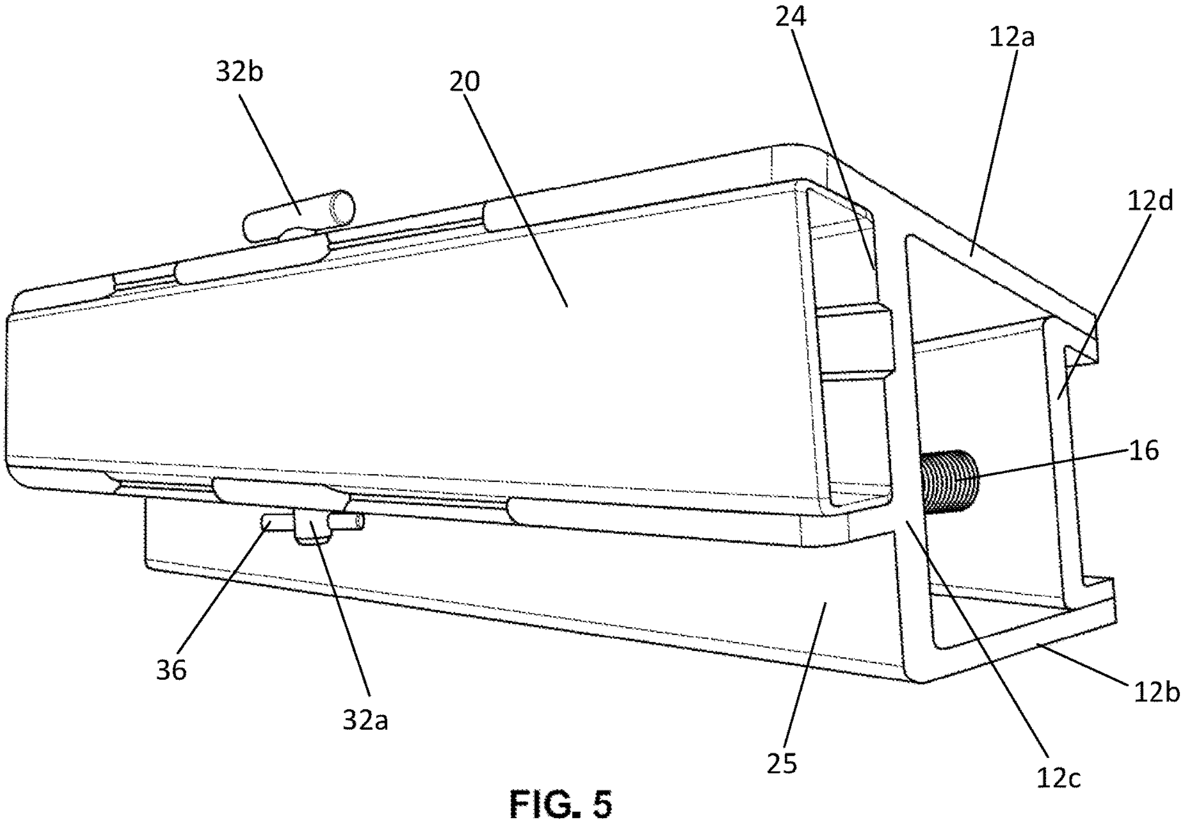
FIG. 5 shows a rear perspective view of the mounting bracket according to the present invention.
Figure 6:
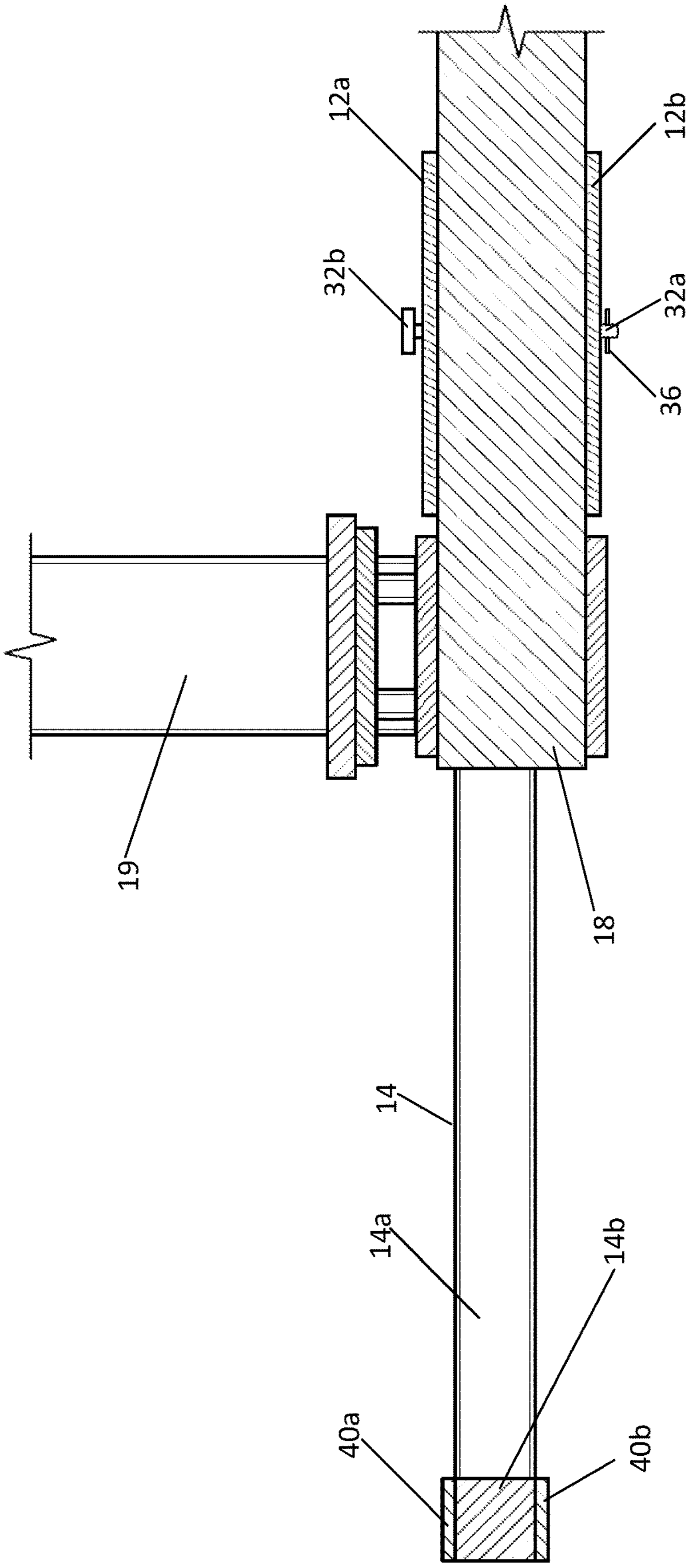
FIG. 6 shows a cross-section view of the extension arm accessory unit mounted to the fork carrier beam of the drywall crane fork assembly according to the present invention.
Figure 7:
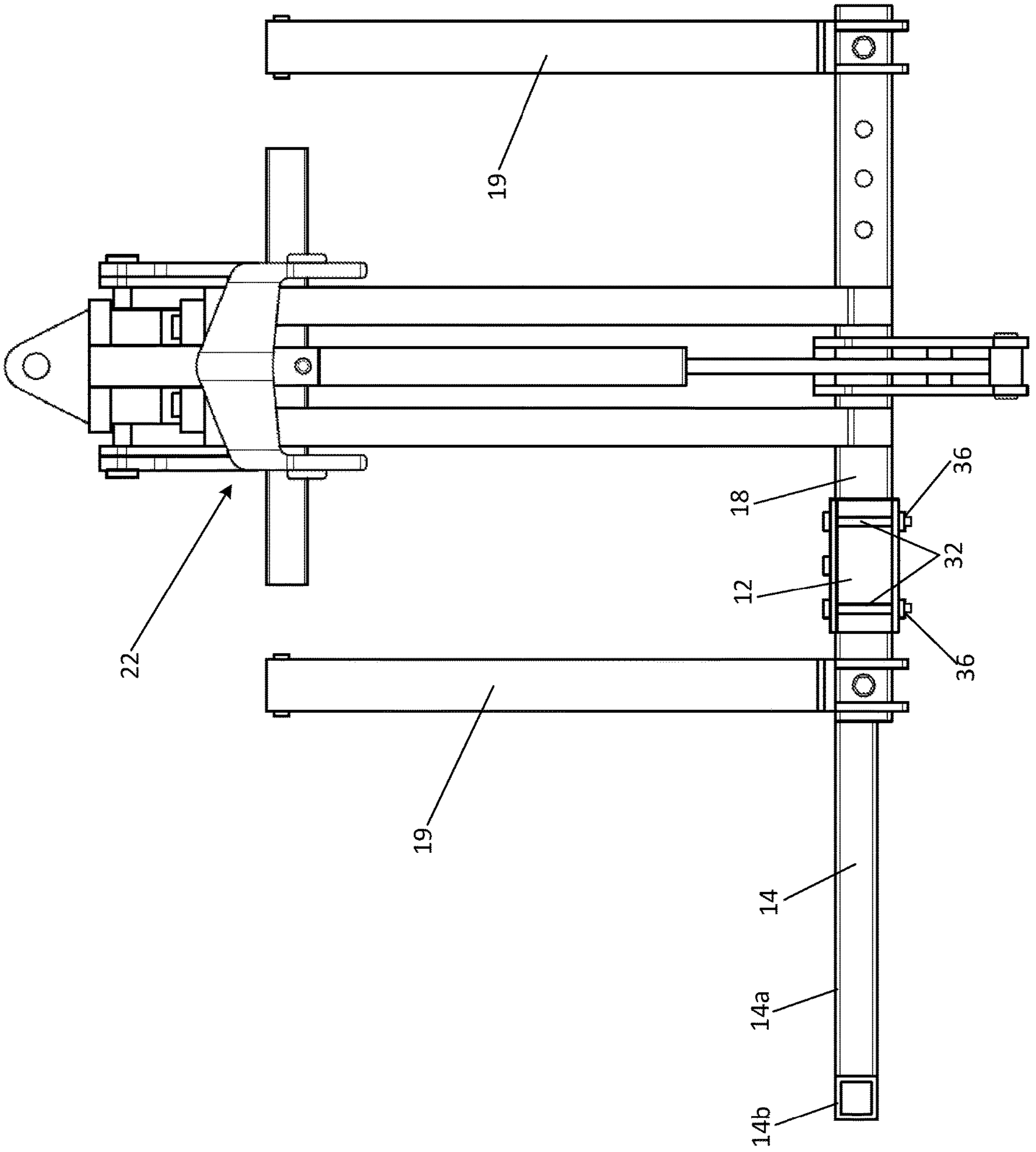
FIG. 7 shows a front side view of the extension arm accessory unit mounted to a fork carrier beam of a drywall crane fork assembly according to the present invention.

Referring to FIGS. 2, 3 and 4, mounting bracket 12 includes a top wall **12*a* and bottom wall 12*b* interconnected by a first sidewall 12*c* to define a generally C-shaped arrangement. The top wall 12*a* and bottom wall 12*b* extend parallel to each other and the first sidewall 12*c* is perpendicular to the top and bottom walls 12*a*, 12*b*. A removable second sidewall 12*d* is releasably attached to the mounting bracket 12. The second sidewall is shown extending between the top wall 12*a* and the bottom wall 12*b* in a perpendicular arrangement opposite the first sidewall 12*c***.

As best shown in FIG. 3, tensioning members 16 are carried by the second sidewall **12*d* for biasing against a side surface of a fork carrier beam 18 when mounted (see FIGS. 6-9). In the illustrated embodiment, tensioning members 16 are threaded bolts or screws that are received in complementary threaded openings 17 in the face of the removable second sidewall 12*d*. Accordingly, by rotating tensioning members 16 to extend toward first sidewall 12*c*, the first sidewall 12*c* is directed against the fork carrier beam as the tensioning members 16 engage the opposite side of the fork carrier beam 18 to secure the mounting bracket 12 to the beam 18. In an alternative arrangement, tensioning members 16 may be fixed to removable second sidewall 12*d* and biased against the fork carrier beam 18 when mounted. However, by making the tensioning members 16 adjustable as illustrated, the mounting bracket 12 can adjust to variations in the dimensions of the fork carrier beam 18** and achieve a more secure mounting arrangement.

Referring to FIGS. 1-5, an extension arm port 20 is carried on an exterior side of the first sidewall **12*c*. Extension arm port 20 includes a port top wall 20*a*, a port bottom wall 20*b* and a port sidewall 20*c* interconnecting the port top and port bottom walls 20*a*, 20*b* to define a hollow interior extending along an axis parallel to a length of the first sidewall 12*c***.

Referring to FIGS. 1 and 2, extension arm 14 is carried in extension arm port 20 in a slidable arrangement within extension arm port 20 to vary the position of the extension arm 14 to a desired reach. In the illustrated embodiment, extension arm 14 has a generally L-shaped arrangement with a first arm portion **14*a* adjustably carried in the extension arm port 20. A second arm portion 14*b* is disposed at a distal end of the first arm portion 14***a* and extends perpendicular to the first arm portion 14*a*. In one embodiment, the first arm portion 14*a* is about 5 feet long for slidably adjusting in extension arm port 20 of mounting bracket 12, and the second arm portion 14*b* is about 20 inches long.

Referring to FIG. 6-9, the mounting bracket 12 is thus removably mountable around fork carrier beam 18 and provides extension arm 14 extending in an adjustable arrangement perpendicular to lifting forks 19 of the drywall crane fork assembly, designated generally as 22, to assist with sliding drywall or other materials off the fork assembly over an extended distance. The illustrated embodiment is designed for mounting to fork assemblies made by Kinshofer and Heiden, but is not limited to these fork assemblies given the adjustability of the mounting bracket provided by the tensioning members 16. In one embodiment, the mounting bracket 12 and extension arm 14 are constructed using 3/16 steel to provide sufficient strength and durability. Other materials and arrangements are considered within the scope of the present invention as would be understood by those skilled in the art.

Figure 8:
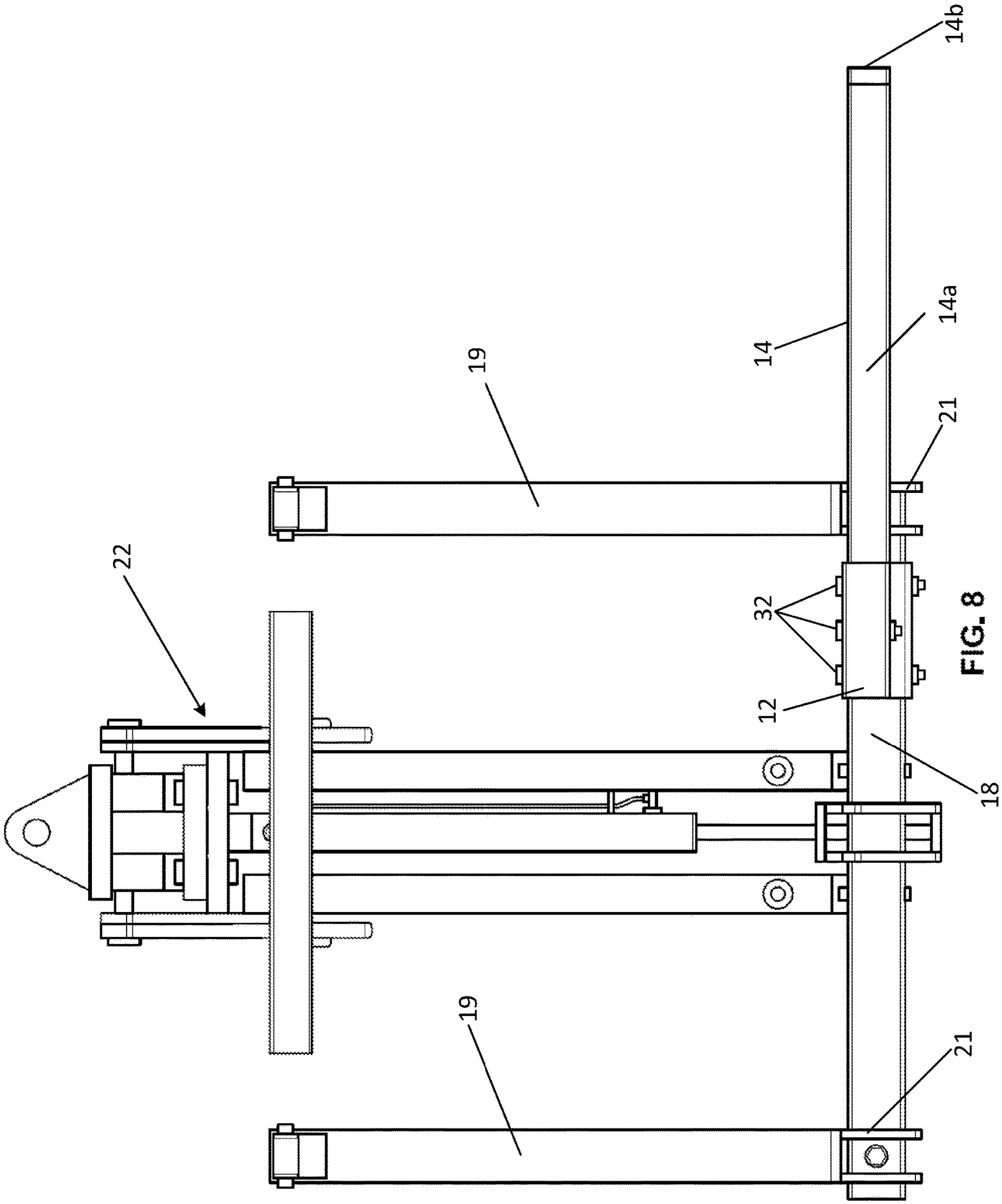
FIG. 8 shows a rear side view of the extension arm accessory unit mounted to a fork carrier beam of a drywall crane fork assembly according to the present invention; and, FIG. 9 shows a perspective view of the extension arm accessory unit mounted to a fork carrier beam of a drywall crane fork assembly with a sheet of drywall extending along the extension arm accessory unit according to the present invention.
Figure 9:
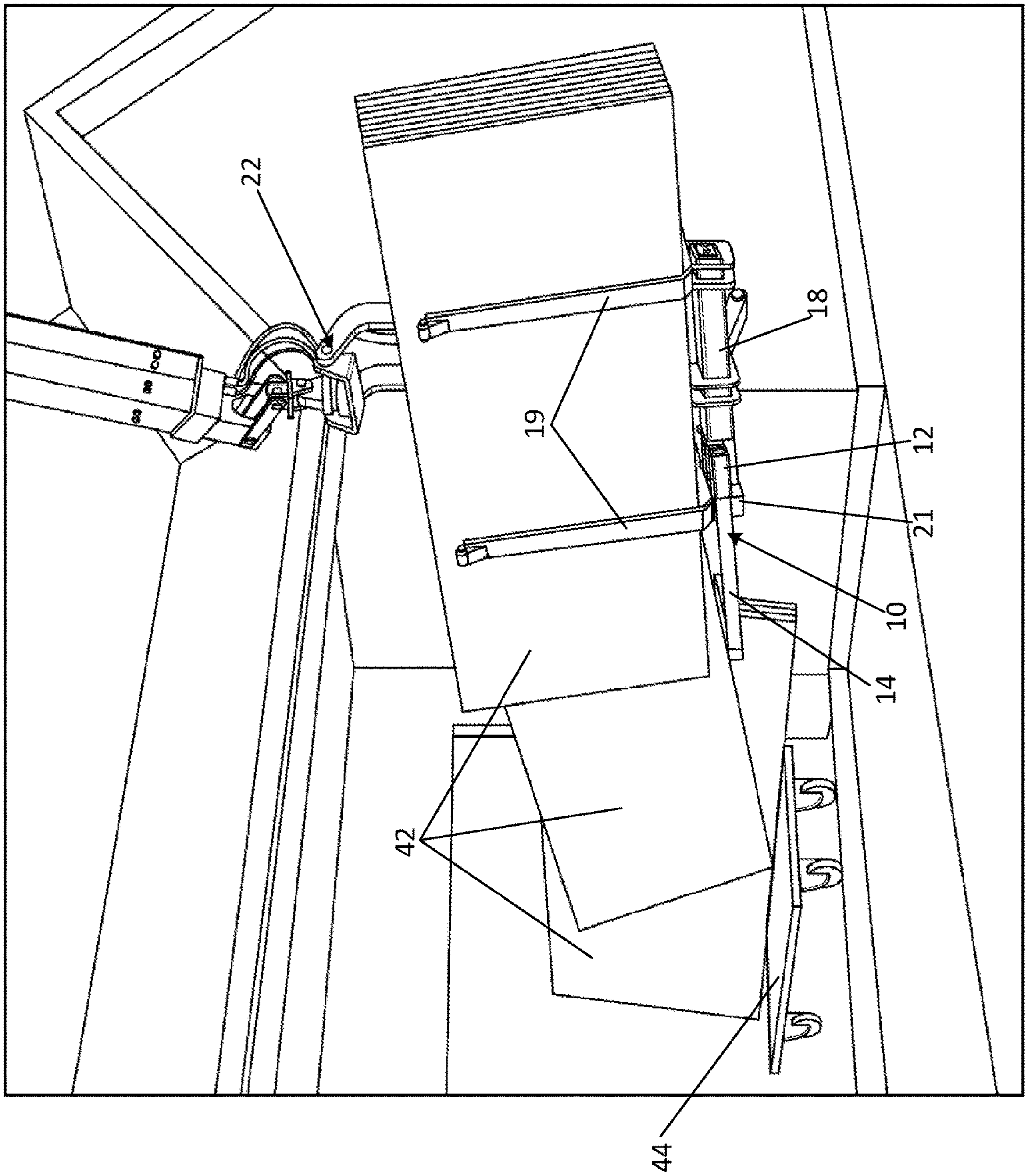

Referring to FIGS. 1-5, a spacer block 24 is disposed in the hollow interior of the extension arm port 20 and carried by the exterior side 25 of the first sidewall 12*c*. The spacer block 24 engages extension arm 14 so that the extension arm 14 is offset from the exterior side of the first sidewall 12*c*. With further reference to FIGS. 8 and 9, the offset provided by spacer block 24 allows extension arm 14 to clear and extend past brackets 21 that secure lifting forks 19 to fork carrier beam 18. Thus, the extension arm accessory unit 10 of the present invention does not require any modification to the fork assembly 22 for mounting the extension arm accessory unit 10 to the fork carrier beam 18.

Referring to FIGS. 2-4, in the illustrated embodiment, removable second sidewall 12*d* includes an upper flange 26*a* and a lower flange 26*b* each extending parallel and adjacent to the top wall 12*a* and the bottom wall 12*b*, respectively, when in position on mounting bracket 12. In position on mounting bracket 12, the upper and lower flanges 26*a* and 26*b* extend inward from a distal end 27*a*, 27*b*, respectively, of each the top and bottom walls 12*a*, 12*b* so that the removable second side wall 12*d* is recessed from the distal ends 27*a*, 27*b* of the top and bottom walls 12*a*, 12*b*.

As best shown in FIG. 2, a pair of openings 28*a*, 28*b* are disposed in a distal end portion of top wall 12*a*. A pair of openings 29*a*, 29*b* are disposed in a distal end portion of bottom wall 12*b*. A complementary pair of openings 30*a*, 30*b* are disposed in the upper flange 26*a* for aligning with the pair of openings 28*a*, 28*b* in top wall 12*a*. A complementary pair of openings 31*a*, 31*b* are disposed in the lower flange 26*b* for aligning with the pair of openings 29*a*, 29*b* in bottom wall 12*b*. Thus, the openings in the top wall, bottom wall, upper flange and lower flange are vertically aligned for receiving a removable securing member 32. Referring to FIGS. 3 and 4, in the illustrated embodiment, removable securing member 32 is inserted and extends through the openings in the top wall, bottom wall, upper flange and lower flange to fasten the removable second sidewall 12*d* to the top wall 12*a* and bottom wall 12*b* of the mounting bracket 12 in a releasable arrangement.

Referring to FIG. 3, in a preferred embodiment, securing member 32 comprises a T-shaped bar having an elongated first portion 32*a* extending through the openings in the top wall, bottom wall, upper flange and lower flange, and a handle portion 32*b* extending perpendicular at a distal end of the first portion 32*a*. Handle portion 32*b* engages the top wall 12*a* to resist downward movement of the elongated first portion 32*a* when extending through the various aligned openings as detailed above. A securing member port 34 is disposed at a distal end portion of the elongated first portion 32*a* opposite the handle portion 32*b*. A removable clip member 36 is inserted and extends through the securing member port 34 when the securing member 32 is dispose in the openings so that the removable clip member 36 engages the bottom wall 12*b* to resist upward movement of the elongated first portion 32*a* to secure the second sidewall 12*d* between the top and bottom walls 12*a*, 12*b* of the mounting bracket 12. As understood by one skilled in the art, the removable clip member 36 may be a cotter pin or the like that extends perpendicular to the length of first portion 32*a* to prevent the securing member from passing through the various openings until the clip member 36 is removed.

Referring to FIGS. 1 and 2, a series of extension arm openings 38 are defined in the first arm portion 14*a* of the extension arm 14 that extend through the extension arm 14 from a top to a bottom side. The extension arm openings 38 are laterally spaced along the length of first arm portion 14*a*. With further reference to FIG. 3, in the illustrated embodiment, openings 39*a*, 39*b* are disposed in the port top wall 20*a* and the port bottom wall 20*b* of the extension arm port 20. Openings 39*a*, 39*b* in the port top wall 20*a* and port bottom wall 20*b* are vertically aligned with a selected extension arm opening 38 for receiving a removable securing member 32 as described above for securing removable second side wall 12*d*. Securing member 32 removably extends through the openings 38, 39*a* and 39*b* in the port top wall, port bottom wall and selected extension arm opening to secure the extension arm 14 in the extension arm port 20 at a desired position. As detailed above, a removable clip member 36 is inserted and extends through the securing member port 34 when the securing member 32 is dispose in the openings 38, 39*a* and 39*b* so that the removable clip member 36 engages the port bottom wall 20*b* of extension arm port 20 to resist removal of securing member 32.

Referring to FIGS. 1 and 2, in the illustrated embodiment a first protection pad 40*a* is disposed on a top side of the second arm portion 14*b* of the extension arm 14. A second protection pad 40*b* is disposed on a bottom side of the second arm portion 14*b* of the extension arm 14. The first and second protection pads 40*a*, 40*b* are releasably mounted to the top and bottom sides of the second arm portion 14*b* using screws 41 or the like so the pads can be replaced as needed due to wear as the materials slides across the second arm portion 14*b*. In one embodiment, the first and second protection pads are made of plastic. Preferably, the plastic is polytetrafluoroethylene (PTFE) commonly known as Teflon to allow materials to easily slide across second arm portion 14*b*.

Referring to FIG. 9, the present invention provides an extension arm accessory unit 10 that can be removably attached to the fork assembly 22 of a crane arm to assist with sliding sheets of drywall 42 (or wood) off the fork assembly and directly onto a material handling cart 44 without damaging the material. The design of the extension arm accessory unit 10 extends the ability to slide drywall panel board 42 or wood onto a material handling cart 44 inside the building that has up to 12 feet of overhang from a roof or awning as shown in FIG. 9. The extension arm accessory unit 10 is not intended for lifting material, but rather to provide support when sliding the material off the fork assembly 22 and onto a material handling cart 44.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. An extension arm accessory unit for a drywall crane fork assembly, said extension arm accessory unit comprising:

a mounting bracket having a top wall and bottom wall interconnected by a first sidewall to define a generally C-shaped arrangement, wherein said top wall and bottom wall extend parallel to each other and said first sidewall is perpendicular to said top and bottom walls;

a removable second sidewall releasably attached to said mounting bracket, wherein said second sidewall extends between said top wall and said bottom wall in a perpendicular arrangement opposite said first sidewall;

a tensioning member carried by said second sidewall for biasing against a fork carrier beam when mounted to draw said first sidewall against said fork carrier beam to secure said mounting bracket to the beam;

an extension arm port carried on an exterior side of said first sidewall, wherein said extension arm port includes a port top wall, a port bottom wall and a port sidewall interconnecting said port top and port bottom walls to define a hollow interior extending along an axis parallel to a length of said first sidewall;

an extension arm carried in said extension arm port, wherein said extension arm has a generally L-shaped arrangement with a first arm portion adjustably carried in said extension arm port, and a second arm portion disposed at a distal end of said first arm portion and extending perpendicular to said first arm portion;

whereby said mounting bracket is removably mountable around a fork carrier beam and provides said extension arm extending in an adjustable arrangement perpendicular to lifting forks of the drywall crane fork assembly to assist with sliding drywall off the fork assembly over an extended distance.

2. The extension arm accessory unit of claim 1 including a spacer block disposed in said hollow interior of said extension arm port and carried by said exterior side of said first sidewall engaging said extension arm so that said extension arm is offset from said exterior side of said first sidewall.

3. The extension arm accessory unit of claim 1 wherein said second sidewall includes an upper flange and a lower flange each extending parallel and adjacent to said top wall and said bottom wall respectively.

4. The extension arm accessory unit of claim 3 wherein said upper and lower flanges extend inward from a distal end of each said top and bottom walls so that said second side wall is recessed from said distal ends of said top and bottom walls.

5. The extension arm accessory unit of claim 4 including at least one opening disposed in a distal end portion of said top wall;

at least one opening disposed in a distal end portion of said bottom wall;

at least one opening in said upper flange; and, at least one opening in said lower flange, wherein said openings in said top wall, bottom wall, upper flange and lower flange are vertically aligned.

6. The extension arm accessory unit of claim 5 including a removable securing member extending through said openings in said top wall, bottom wall, upper flange and lower flange fastening said second sidewall to said top wall and bottom wall of said mounting bracket in a releasable arrangement.

7. The extension arm accessory unit of claim 6 wherein said securing member comprises a T-shaped bar having an elongated first portion extending through said openings in said top wall, bottom wall, upper flange and lower flange, and a handle portion extending perpendicular at a distal end of said first portion, wherein said handle portion engages said top wall to resist downward movement of said elongated first portion when dispose in said openings.

8. The extension arm accessory unit of claim 6 including a securing member port disposed at a distal end portion of said elongated first portion opposite said handle portion; and, a removable clip member extending through said securing member port when said securing member is dispose in said opening so that said removable clip member engages said bottom wall to resist upward movement of said elongated first portion to secure said second sidewall between said top and bottom walls of said mounting bracket.

9. The extension arm accessory unit of claim 1 including a series of extension arm openings defined in said first arm portion of said extension arm;

at least one opening in said port top wall and said port bottom wall, wherein said opening in said port top wall and port bottom wall are vertically aligned with selected extension arm openings; and, a securing member removably extending through said openings in said port top wall, port bottom wall and selected extension arm openings to secure said extension arm in said extension arm port at a desired position.

10. The extension arm accessory unit of claim 1 including a first protection pad disposed on a top side of said second arm portion of said extension arm, wherein said first protection pad is releasably mounted to said top side of said second arm portion.

11. The extension arm accessory unit of claim 10 including a second protection pad disposed on a bottom side of said second arm portion of said extension arm, wherein said second protection pad is releasably mounted to said bottom side of said second arm portion.

12. The extension arm accessory unit of claim 11 wherein said first and second protection pads are made of plastic.

13. The extension arm accessory unit of claim 12 wherein said plastic is polytetrafluoroethylene (PTFE).

14. The extension arm accessory unit of claim 1 wherein said tensioning member comprises a screw carried in a threaded opening of said second sidewall, wherein rotation of said screw directs said screw to engage against a surface of said fork carrier beam and draw said first sidewall against said fork carrier beam.

15. An extension arm accessory unit for a drywall crane fork assembly, comprising:

a drywall crane fork assembly including a fork carrier beam carrying a pair of lifting forks;

a mounting bracket carried on said fork carrier beam;

said mounting bracket having a top wall and bottom wall interconnected by a first sidewall to define a generally C-shaped arrangement, wherein said top wall and bottom wall extend parallel to each other and said first sidewall is perpendicular to said top and bottom walls, and wherein said fork carrier beam is disposed between said top and bottom walls;

a removable second sidewall releasably attached to said mounting bracket, wherein said second sidewall extends between said top wall and said bottom wall in a perpendicular arrangement opposite said first sidewall so that said fork carrier beam is disposed between said first and second sidewalls;

a tensioning member carried by said second sidewall biasing against said fork carrier beam and drawing said first sidewall against said fork carrier beam to secure said mounting bracket to said beam;

an extension arm port carried on an exterior side of said first sidewall, wherein said extension arm port includes a port top wall, a port bottom wall and a port sidewall interconnecting said port top and port bottom walls to define a hollow interior extending along an axis parallel to a length of said first sidewall;

an extension arm carried in said extension arm port, wherein said extension arm has a generally L-shaped arrangement with a first arm portion adjustably carried in said extension arm port, and a second arm portion disposed at a distal end of said first arm portion and extending perpendicular to said first arm portion;

whereby said mounting bracket is removably mountable around said fork carrier beam and provides said extension arm extending in an adjustable arrangement perpendicular to said lifting forks of the drywall crane fork assembly to assist with sliding drywall off said fork assembly over an extended distance.

16. The extension arm accessory unit of claim 15 including a spacer block disposed in said hollow interior of said extension arm port and carried by said exterior side of said first sidewall engaging said extension arm so that said extension arm is offset from said exterior side of said first sidewall.

17. The extension arm accessory unit of claim 15 including a first protection pad disposed on a top side of said second arm portion of said extension arm, wherein said first protection pad is releasably mounted to said top side of said second arm portion; and, a second protection pad disposed on a bottom side of said second arm portion of said extension arm, wherein said second protection pad is releasably mounted to said bottom side of said second arm portion.

18. An extension arm accessory unit for a drywall crane fork assembly, said extension arm accessory unit comprising:

a mounting bracket a generally C-shaped arrangement for receiving a fork carrier beam of a drywall crane fork assembly;

a removable sidewall carried by said mounting bracket for enclosing said mounting bracket around said fork carrier beam when mounted;

a tensioning member carried by said removable sidewall for biasing against the fork carrier beam when mounted to draw said mounting bracket against said fork carrier beam to secure said mounting bracket to the beam;

an extension arm port carried by said mounting bracket;

an extension arm carried in said extension arm port, wherein said extension arm has a generally L-shaped arrangement with a first arm portion adjustably carried in said extension arm port, and a second arm portion disposed at a distal end of said first arm portion and extending perpendicular to said first arm portion;

at least one spacer block disposed in said extension arm port engaging said extension arm so that said extension arm is laterally spaced from said mounting bracket to accommodate and extend past lifting forks carried on said fork carrier beam;

a first protection pad disposed on a top side of said second arm portion of said extension arm, wherein said first protection pad is releasably mounted to said top side of said second arm portion; and, a second protection pad disposed on a bottom side of said second arm portion of said extension arm, wherein said second protection pad is releasably mounted to said bottom side of said second arm portion;

whereby said mounting bracket is removably mountable around the fork carrier beam and provides said extension arm extending in an adjustable arrangement perpendicular to lifting forks of the drywall crane fork assembly to assist with sliding drywall off the fork assembly over an extended distance.

19. The extension arm accessory unit of claim 18 wherein said first and second protection pads consist of polytetrafluoroethylene (PTFE).

20. The extension arm accessory unit of claim 18 wherein said tensioning member comprises a screw carried in a threaded opening of said removable sidewall, wherein rotation of said screw directs said screw to engage against a surface of the fork carrier beam and draw said first sidewall against the fork carrier beam.

* * * * *